United States Patent [19]
Tavallaei et al.

[11] Patent Number: 5,918,059
[45] Date of Patent: Jun. 29, 1999

[54] METHOD AND APPARATUS FOR RESPONDING TO ACTUATION OF A POWER SUPPLY SWITCH FOR A COMPUTING SYSTEM

[75] Inventors: Siamak Tavallaei, Spring; John S. Lacombe, Tomball; Jeffrey S. Autor, Houston; Jose A. Santin, Clear Lake Shores, all of Tex.

[73] Assignee: Compaq Computer Corporation, Houston, Tex.

[21] Appl. No.: 08/911,648

[22] Filed: Aug. 15, 1997

[51] Int. Cl.$^6$ .............................. G06F 1/26; G06F 1/32
[52] U.S. Cl. .............................. 395/750.01; 395/750.03
[58] Field of Search ........................ 395/750.01, 750.03, 395/750.05, 750.06, 750.07; 364/707, 492; 307/66

[56] References Cited

U.S. PATENT DOCUMENTS

| | | | |
|---|---|---|---|
| 4,203,153 | 5/1980 | Boyd .................................. | 395/750.05 |
| 4,698,748 | 10/1987 | Juzswik et al. ................... | 395/750.04 |
| 5,526,289 | 6/1996 | Dinh et al. ......................... | 364/557 |
| 5,530,879 | 6/1996 | Crump et al. ...................... | 395/750.05 |
| 5,574,667 | 11/1996 | Dinh et al. ......................... | 364/557 |
| 5,631,800 | 5/1997 | Jin et al. ............................. | 361/103 |
| 5,634,038 | 5/1997 | Saitoh ................................. | 395/490 |
| 5,638,895 | 6/1997 | Dodson .............................. | 165/121 |

OTHER PUBLICATIONS

The I²C–Bus and how to use it (including specification); *Philips Semiconductor;* Apr. 1995; pp. 1–24.

"Remote 8–bit I/O expander for I²C–Bus" Data Sheet; *Philips Semiconductor;* Apr. 2, 1997; pp. 1–23.

Farnsworth, C.; "Low Power Implementation of an I²C–Bus Expander"; http://maveric0.uwaterloo.ca/amulet/publications/thesis farnsworth94_msc.html; Jun. 16, 1997; one page.

Collins, Andy; "Interfacing TMS370 Microcontrollers to I²C–Bus ICs"; Logikos; wysiwyg://111/http://www.logikos.com/tms370.html; Jun. 16, 1997; pp. 1–6.

"I²C–Bus Expander" Application Note AN036; *Philips Semiconductors Programmable Logic Devices;* Oct., 1993; 22 pages.

"The PCI (Peripheral Component Interconnect) Bus"; Aug. 6, 1997; pci.txt at www.gl.umbc.edu; pp. 1–7.

"Re: What's the difference between locks and semaphores?"; Jim Barton (jmb@patton.wpd.sgi.com) Jan. 2, 1991; Accessed Jun. 16, 1997; http://www.sgi.com/Archive/comp.sys.sgi/1991/Jan/0006.html.

"Internal Data Structures, 6.4.3 Semaphores" Basic Concepts; Accessed Jul. 11, 1997; http://linux.www.db.erau.edu/LPG/node47.html.

"The PCI Local Bus", Accessed Jul. 27, 1997; http://www.rns.com/whats new/wh pci.html.

"PCI Bus Technology" Information Brief; *IBM Personal Computing Solutions;* Accessed Jul. 27, 1997; http://www.us.pc.ibm.com/infobrf/ibpci.html.

(List continued on next page.)

*Primary Examiner*—Gopal C. Ray
*Attorney, Agent, or Firm*—Jenkens & Gilchrist P.C.

[57] ABSTRACT

Through a menu driven selection procedure, a user is given options for how a server should respond to an actuation of a power switch. In one option, the power switch is disabled to prevent accidental shut down of the power supply in response to power switch actuation. In another option, the shut down of the power supply follows soon after the expiration of a count down timer which is triggered by power switch actuation. A subsequent actuation of the power switch in this option aborts the count down. In yet another option, the shut down of the power supply follows soon after the completion of a graceful shut down of the server operating system which is triggered by power switch actuation. A subsequent actuation of the power switch in this option causes an immediate shut down of the power supply.

21 Claims, 4 Drawing Sheets

OTHER PUBLICATIONS

"PCI164 Screamer Functional Diagram" Microway; Accessed Jul. 27, 1997; http://www.microway.com/block.html.

"The PCI (Peripheral Component Interconnect) Local Bus" description of PCI Bus; Accessed Jul. 27, 1997; http://www.sundance.com/pci.html.

"CMOS Bus Switches Provide Zero Delay Bus Communication" Application Note AN–09; *Quality Semiconductor Inc.;* date unknown; pp. 1–9.

"High–Performance CMOS Analog 8–Channel Switch" QS4A05Q Preliminary; *Quality Semiconductor Inc.;* May 30, 1996; pp. 1–7.

"Quickswitch® Converts TTL Logic to Hot Plug Operation" Application None AN–13; *Quality Semiconductor Inc.;* date unknown; pp. 1–5.

METHOD AND APPARATUS FOR RESPONDING TO ACTUATION OF A POWER SUPPLY SWITCH FOR A COMPUTING SYSTEM

BACKGROUND OF THE INVENTION

1. Technical Field of the Invention

The present invention relates to computing systems and, in particular, to a power supply for a computing system as well as a method and apparatus for effectuating a soft reset of that power supply.

2. Description of Related Art

Networks serve the purpose of connecting many different personal computers (PCs), workstations, or terminals to each other, and to one or more host computers, printers, file servers, and the like, so that expensive computing assets, programs, files and other data may be shared among many users.

In a network utilizing a client/server architecture, the client (terminal, personal computer or workstation) is the requesting machine and the server is the supplying machine. The requesting and supplying machines are connected via a network, such as a local area network (LAN), wide area network (WAN) or metropolitan area network (MAN). This architecture is in contrast to early network systems that utilized a mainframe with dedicated terminals.

In a client/server network, the client typically contains a user interface and may perform some or all of the application processing and as mentioned above can include personal computer or workstations. The server in a client/server computer network can be high-speed microcomputers or minicomputers, and in the case of a high-end server can include multiple processors and mass data storage devices such as multiple CD-ROM drives and multiple hard drives, preferably with redundant array of inexpensive disk (RAID) protection. An exemplary server such as a database server maintains the databases and processes the requests received from the client to extract data from or update the database. An application server provides additional business processing for the clients. The network operating system (NOS) together with the database management system (DBMS) and transaction monitor (TP monitor) are responsible for maintaining the integrity and security of the server.

Client/server networks are widely used throughout many different industries and business organizations, especially where mission-critical applications requiring high performance are routinely launched. The mass storage and multi-processing capabilities provided by current client/server network systems (for example, the high-end servers) that run such applications permit a wide range of essential services and functions to be provided through their use.

As can be appreciated, many of these businesses are highly dependent upon the availability of their client/server network systems to permit these essential network services and functions to be carried out. As these client/server network systems become increasingly essential to the every-day operations of these businesses, additional steps need to been taken in the design and construction of the server in the client/server network system to ensure its continuous availability to the clients. That is to say, in the design and construction of a server, steps need to be taken to ensure that the server can be operated with little or no downtime.

It can be appreciated by those skilled in the art that high availability, reliability and serviceability are valuable design aspects in ensuring that a server is a "zero downtime" system that will operate with little or no downtime. The modularity of components within a server has been recognized as an important design consideration in ensuring that the downtime of a server will be minimized. Modules can be removed and examined for operability or other purposes much easier than permanently mounted fixtures within a server chassis. When various components of a server can be provided in a modular form, they can also be readily replaced to maintain the operational status of the server with minimal downtime.

Removable modular components may include disc drives and power supplies. As described above, the removableness of modular components allows for better overall serviceability of the computing system which is a distinct advantage. For example, a defective power supply in the server generally requires prompt replacement in order to limit downtime. Modular components and connectors facilitate prompt replacement and are thus popular in many computer designs.

Originally, a rule of practice in the maintenance of modular components or printed circuit boards of a server was that of turning the power to the server off before any modular components or printed circuit boards were removed from or added to the chassis or support frame of the server. Recent innovations have centered around a highly desirable design goal of "hot-pluggability" which addresses the benefits derived from inserting and removing modular components and printed cards from the chassis of the server when the server is electrically connected and operational. It can be readily appreciated that modularization and hot-pluggability can have a significant bearing on the high availability aspect of a high-end server.

Hot-pluggable components may include storage or disc drives, drive cages, fans, power supplies, system I/O boards, control boards, processor boards, and other sub-assemblies. The ability to remove these constituent components without having to power down the server allows for better overall serviceability of the system, which is a distinct advantage to both the user and the maintenance technician.

Component redundancy has also been recognized as an important design consideration in ensuring that a server will operate with little or no downtime. Essentially, component redundancy is typically provided in a system to better ensure that at least one of the redundant components is operable, thereby minimizing the system down time. With component redundancy, at least two components are provided that can perform the same function, such that if one of the components becomes faulty for some reason, the operation falls over to the redundant component. When at least one of the redundant components is operable, continued operation of the computing system is possible even if others of the redundant components fail. To further enhance reliability and serviceability, redundant components have been made hot-pluggable.

Dynamic reconfiguration of a server system can also be accomplished by providing upgradable modular components therein. As can be readily appreciated, this objective can be accomplished by the addition or substitution of components having different circuits, preferably updated or upgraded, disposed there within. When components are redundant and hot-pluggable, reconfiguration of the server is often possible without taking the server offline.

Another important design aspect with respect to providing redundant and hot-pluggable components in a server system is to ensure and maintain a safe working environment while the server is operating and being repaired or upgraded. Accordingly, when the system components are swapped or upgraded, the exposure of hot-connectors and contacts must be kept to a minimum. It can be appreciated by those skilled in the art that further developments in this area would significantly enhance the reliability and serviceability aspects of a high-end server system.

To further enhance the serviceability of server systems, additional innovations may be required in the design and construction of diagnostic sub-systems thereof. In existing client/server network systems it is often difficult to obtain in a timely manner important diagnostic data and information corresponding to a component failure in order to facilitate the quick serviceability of the server. Therefore, it can be appreciated that the more information that can be readily provided to locate a defective component or problem with the server, the better is the optimization of the amount of time the server is up and running.

In spite of the improvements in system performance reliability provided by redundancy and the availability of hot-pluggable components, instances sometimes arise where it becomes necessary to power down the server. Accordingly, the server includes a power switch which may be manually actuated to exercise control over the application of power to the server components. Care must be taken, however, to guard against the accidental actuation of the power switch. For example, a user or maintenance person may inadvertently bump up against the power switch. When such an event occurs, it is vitally important that the power status of the server not be changed. One reason for this is that a shut down of the server may result in the interruption of an important processing task as well as the loss of valuable data currently being processed under that task. At the same time, it is equally important for the server to power down in response to an intentional action. When data integrity is not at issue, that power down may occur immediately. When, on the other hand, the data must be preserved or a certain processing task completed, a graceful shut down of the server is preferred.

Accordingly, there is a need for a procedure for more effectively and efficiently controlling the powering down of a server. Preferably, this procedure would prevent against accidental shut down, support immediate shut down when appropriate, and provide for a graceful shut down when necessary to preserve data integrity.

SUMMARY OF THE INVENTION

In a computing system, a power supply is signaled in response to an actuation of a power supply switch. Responsive thereto, an internal timer of the power supply begins counting down to power termination. A micro-controller of the power supply further signals an interrupt to a processor of the computing system. The processor responds to receipt of the interrupt by generating, in accordance with a user selected power down option, a command signal to control the setting of the programmable timer and, hence, the timing of termination of power application by the power supply. When the internal timer times-out, power is removed by the power supply micro-controller from the server.

The user selected power down option for responding to actuation of the power supply switch is chosen through a menu driven selection procedure. When a disable option is selected from the menu, the actuation of the power switch does not cause a termination of power application by the power supply. This prevents against an accidental power down caused by inadvertent actuation of the power switch. When an absolute option is selected from the menu, the interrupt triggers the starting of a count down timer with termination of power application by the power supply following thereafter. This allows for an immediate shut down of the power supply. When a graceful option is selected, the interrupt triggers a graceful shut down of the server operating system with termination of power application by the power supply following thereafter. This allows currently used data to be saved and, when necessary, for important processing tasks to be completed prior to powering down.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
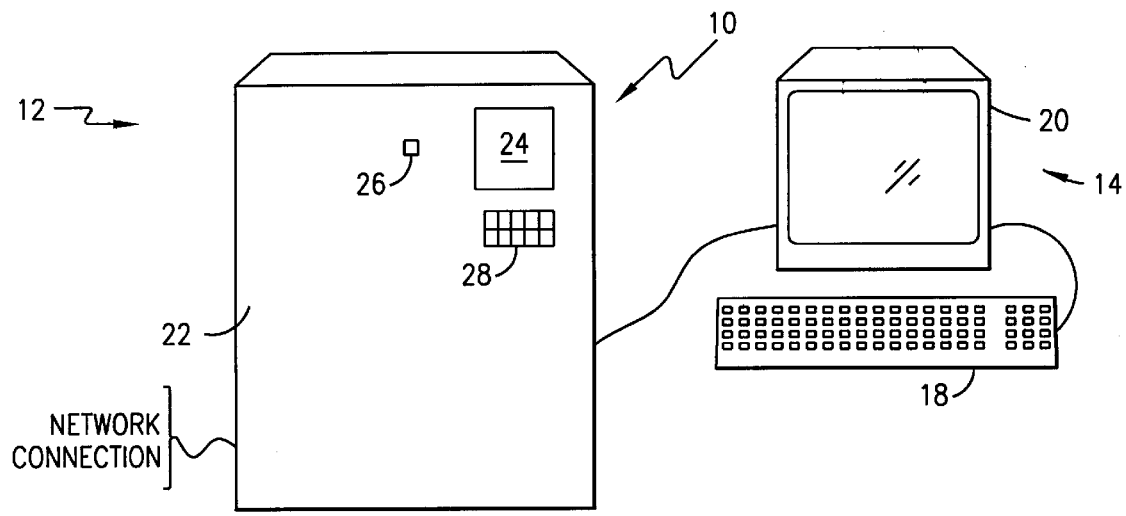
FIG. 1 is a pictorial view of a computing system.

Reference is now made to FIG. 1 wherein there is shown a pictorial view of a computing system 10 comprising a server 12 and a server control terminal 14 connected by a communications link 16. The server control terminal 14 includes a keyboard data entry device 18 as well as a display 20. Through the keyboard data entry device 18, a user may input commands to the server 12. Visual display of the user input, as well as the display of graphical information generated by the server 12, are presented on the display 20.

The server 12 may further be connected to a plurality of client terminals (not shown) in a network configuration. Although not explicitly shown, the network communications link may comprise any suitable bi-directional link including both wireline (for example, cable) or wireless (for example, radio or infra-red) links implementing an appropriate networking communications protocol. In this network configuration, the server functions in a well known, centralized manner to provide processing services to the client terminals.

Positioned on an outer surface 22 (preferably comprising a front panel) of the server 12 is a display panel 24 for visibly conveying server generated operating status information. This information may comprise such things as error messages, internal hardware status and configuration data, network status information, power supply status information, and the like. Also included positioned on the outer surface 22 of the server 12 is a server power switch 26 which preferably comprises a single-pole, single-throw push button switch. "Actuation" of the server power switch 26, as that word is used herein, refers generally to user selection of the switch and, in particular, to the depressing of the push button switch. The outer surface 22 of the server 12 may, if desired, also support a keypad data entry device 28 for inputting server-related control and operation information, selecting operation and configuration choices in response to prompts presented by the display panel 24, and selecting certain server generated operating status information for display. The keypad data entry device 28 may include a sub-set of keys from, or perhaps different keys than, the keys of the server control terminal 14 keyboard 18. The display panel 24 may, but need not necessarily, display the same information as is presented on the server control terminal 14 display 20.

Figure 2:
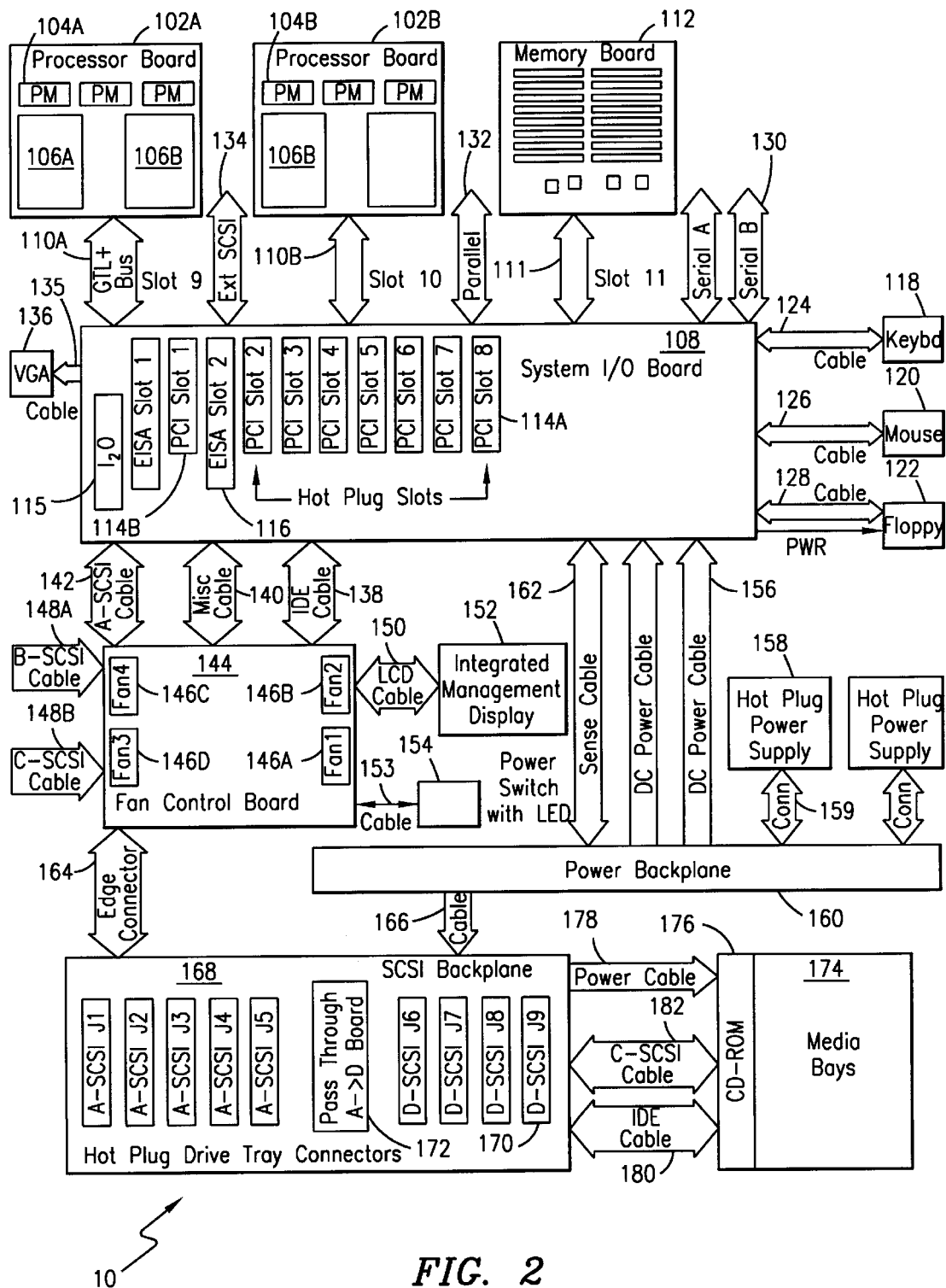
FIG. 2 is a board-level block diagram of the computing system of FIG. 1.

Reference is now made to FIG. 2 wherein there is shown a board-level block diagram of the computing system of FIG. 1. The computing system 10 comprises multiple processor boards 102A and 102B, each including at least one, and preferably a plurality of, processors 106A and 106B. The processor boards 102A and 102B further each include multiple power modules 104A and 104B.

Each of the processor boards 102A and 102B is connected to a system input/output (I/O) board 108 via a suitable bus connector or slot 110A and 110B. In the computing system 10, the bus connector slots are preferably compatible with the Gunning Transistor Logic (GTL) bus protocol. As discussed in more detail below, the system I/O board 108 includes multiple input/output subsystems.

A memory board 112 is also coupled to the system I/O board 108 through a memory connection slot 111. The memory board 112 comprises several dual in-line memory modules (DIMMs) having known sizes, for example, 8 MB, 16 MB, 32 MB, 64 MB, 128 MB, and 256 MB. The particular memory configuration provided with the memory board 112 may be organized in any suitable fashion as is well known to those skilled in the art.

The system I/O board 108 further includes multiple expansion slots, suitable for different bus types. These expansion slots may be selectively provided with "hot-pluggable" capability. One of ordinary skill in the art can readily appreciate that the ability to replace an expansion card (not shown), receivable at an expansion slot, without powering down the system 10 contributes to rendering the system a "zero downtime" system with high availability. The multiple expansion slots comprise those that may be operable with the Peripheral Component Interconnect (PCI) bus type (for example, slots 114A and 114B), as well as those slots that are compatible with the Extended Industry Standard Architecture (EISA) bus type (for example, slot 116). It should be appreciated that either category of the expansion slots may be provided with hot-pluggability. The system I/O board 108 additionally includes a serial port connection (for example, serial connector 130), a parallel port connection (for example, parallel connector 132), and a connector 134 compatible with the Small Computer System Interface (SCSI) bus type.

The system I/O board 108 is coupled to a host of input and output devices via cables, for example, a keyboard 118 with cable 124, a pointing device 120 with cable 126, a flexible disk drive 122 with cable 128, and a monitor 136 with cable 135. A separate power connection path 121 is also provided between the flexible disk drive 122 and the system I/O board 108.

The system I/O board 108 further provides an "intelligent I/O" ($I_2O$) bus connector 115 for accelerating the performance of selected PCI-compatible expansion slots. A fan control board 144 is coupled to the system I/O board 108 through a SCSI cable 142, a miscellaneous cable 140 and an Integrated Drive Electronics (IDE) cable. The fan control board 144 includes multiple fan connectors, for example, fan connector 146A–146D, used for coupling hot-pluggable fans. The fan control board 144 may be provided with additional SCSI-compatible cables, for example, cables 148A and 148B, a display cable 150 coupled to an integrated management display (IMD) unit 152 (also referred to as display 24), and a power switch cable 153 coupled to a power switch 154.

The miscellaneous cable connector 140 joining the fan control board 144 with the system I/O board 108 preferably carries signals generated by the IMD unit 152, various interlock signals (provided by an interlock cabling system (not shown) interconnecting various boards), temperature signals, fan control signals, audio signals, and the like.

The system I/O board 108 of the computing system 10 is coupled to a power backplane 160 via a sense cable 162 and at least one DC power cable 156. Redundant hot pluggable power supply units 158 are connected to the power backplane 160 through hot plug power connectors 159. Both the fan control board 144 and the power backplane 160 are coupled to a SCSI backplane 168 via an edge connector 164 and a power-SCSI backplane cable 166, respectively. The SCSI backplane includes multiple SCSI drive tray connectors (for example, tray connector 170). The SCSI drive tray connectors are also provided with the hot plug capability in order to enhance the high availability aspect thereof. A media power cable 178 connects the SCSI backplane 168 to a media bay 174 and CD-ROM drive 176. A media SCSI cable 182 and an IDE cable 180 are also disposed between the SCSI backplane and the CD-ROM/media bay 176/174.

Figure 3:
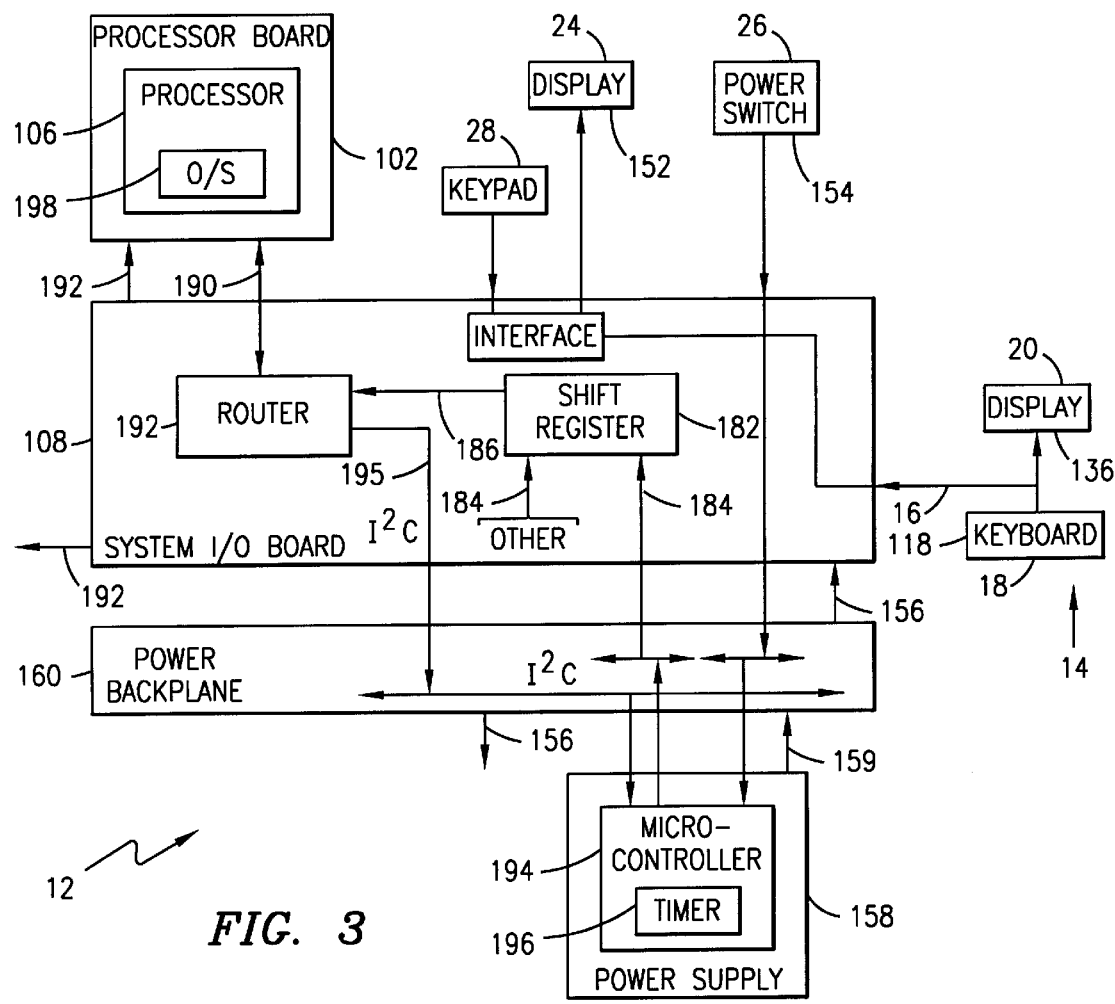
FIG. 3 is a functional block diagram relating to the computing system board-level view of FIG. 2 which focuses on power supply shut down functionality.

Reference is now made to FIG. 3 wherein there is shown a functional block diagram of the computing system 10 which focuses on server power down functionality provided by the board-level block diagram of FIG. 2. Mounted to the power backplane 160 of the server 12 is the system input/output (I/O) board 108 and at least one power supply 158. Power, perhaps at multiple direct current voltage levels (if necessary), is applied by the power supply 158 via connection 159 to the power backplane 160. This applied power is distributed by the power backplane 160 via connections 156 to the system I/O board 108 as well as to other components (such as other backplanes and devices), not shown, of the server 12 which are mounted or connected to the power backplane.

The system I/O board 108 provides a majority of the system logic for the server 12. One functionality provided by this system logic is to interface with the server 12 display 24 (i.e., integrated display 152) and keypad 28, as well as to interface with the server terminal 14 keyboard 18 and display 20. Another functionality provided by this system logic is a serial-in-parallel-out shift register 182 which receives serial interrupt signals on interrupt input lines 184, converts these signals, and outputs parallel interrupt signals on interrupt output bus 186. Yet another functionality provided by this system logic is to communicate 188 signals resulting from actuations of the power switch 26 through the system I/O board 108 to the power backplane 160. Still another functionality provided by this system logic is to interface 190 with at least one processor 106 of the processor board 102 mounted to the system I/O board 108. Yet another functionality provided by this system logic is a router 192 which, among performing other functions, operates to route parallel interrupt signals received over interrupt output bus 186 to the at least one processor 106 over interface 190, and to route processor commands received over the interface 190 for output on an $I^2C$ bus 195. Another functionality provided by the system I/O board 108 is to distribute power applied by the power backplane 160 via connections 192 to the other components (such as other backplanes and devices) of the server 12 which are mounted or connected to the system I/O board. The system logic of the system I/O board 108 further provides numerous other functionalities (not shown) which are not necessarily relevant to the present invention but do assist in the operation of the server with respect to other functionalities.

The power supply 158 includes a micro-controller 194 that is connected through the power backplane 160 to receive the signals resulting from actuations of the power switch 26. These power switch related signals are communicated 188 through the system I/O board 108. The micro-controller 194 is further connected through the power backplane 160 to generate, and transmit over the interrupt input lines 184, serial interrupt signals for application to the parallel-in-serial-out shift register 182 of the system I/O board 108. The micro-controller 194 accordingly functions in one respect to generate such a serial interrupt signal for output in response to a received signal over interface 188 indicative of an actuation of the power switch 26. The micro-controller 194 is further connected through the power backplane 160 to receive generated processor commands sent by the router 192 over the I²C bus 195. A timer 196 is included in the micro-controller 194. Responsive to the received signal indicative of an actuation of the power switch 26, the micro-controller 194 initiates a count down of the time 196. A shut down of the power supply 158 by the micro-controller 194 occurs when the timer 196 expires. The micro-controller 194 accordingly functions in another respect to control operation of the power supply 158 and, in particular, the generation of the power which is applied via connection 159 to the power backplane 160. Additionally, the time period measured by the timer 196 may be specifically set to a certain period, or alternatively re-set to a predetermined period, in response to the processor commands received over the I²C bus 195. Thus, an immediate shut down may be commanded by loading the timer at re-set with a zero (or near-zero) value. Still further, the processor command sent of the I²C bus 195 may specifically command an immediate power down.

The server is selectively configured to respond in different ways to an actuation of the power switch 26. To support this selective configuration, a user, through selection of an appropriate key or combination of keys on either the keyboard 18 (of server control terminal 14) or keypad 28, gains access to a power down configuration menu. This menu is visually presented to the user on either the display 20 (of the server control terminal 14) or the display 24. By selecting one of the menu presented options (to be discussed in more detail herein), the user chooses the response which is implemented by the server 12 following an activation of the power switch 26.

A first one of the menu presented options is a "Power Down Disable" option. The Power Down Disable option essentially disables the power switch 26. By this it is meant that the power switch 26 cannot be used to exercise control over the operation of the power supply 158. This option is an attractive option to be selected by the user in situations where the user wants to prohibit any type of power supply 158 shut down and/or to protect against accidental actuation of the power switch 26. When the Power Down Disable option has been selected, the server 12 responds to a subsequent actuation of the power switch 26 by displaying a message on the display 20 (of the server terminal 14) or the display 24 informing the user that a powering down of the power supply 158 is not permitted in the current configuration and requesting user acknowledgment of the same by making another actuation of the power switch 26. No power supply 158 shut down will ever occur as a result of power switch 26 actuation when configured for this option.

A second one of the menu presented options is a "Power Down Absolutely" option. The Power Down Absolutely option essentially enables the power switch 26 to trigger a powering down of the power supply 158 following the expiration of a count down period. This option is an attractive option to be selected by the user in situations where the user wants to exercise absolute control over the functional operation of the power supply 158. When the Power Down Absolutely option has been selected, the server 12 responds to a subsequent actuation of the power switch 26 by displaying a message on the display 20 (of the server control terminal 14) or the display 24 informing the user that a powering down of the power supply 158 is in progress and further providing a count down of the time remaining until the power down. If the user should make another actuation of the power switch 26 before the count down period expires, the power down procedure is aborted. Otherwise, a shut down of the power supply follows soon after (or immediately at) the expiration of the count down.

A third one of the menu presented options is a "Power Down Gracefully" option. The Power Down Gracefully option essentially enables the power switch 26 to trigger a powering down of the power supply 158 following a shutting down of an operating system (O/S) 198 for the server 12. This option is an attractive option to be selected by the user in situations where the user wants the server 12 to exercise control over the functional operation of the power supply 158. When the Power Down Gracefully option has been selected, the server 12 responds to a subsequent actuation of the power switch 26 by displaying a message on the display 20 (of the server control terminal 14) or the display 24 informing the user that a graceful powering down of the power supply 158 is in progress. In the meantime, the server 12 instigates a procedure for graceful shut down of the operating system 198. By "graceful" it is meant a method for shutting down the server 12 (and in particular its processor 106 supported operating system 198) without any loss or corruption of data. A shut down of the power supply follows soon after (or immediately at) completion of the graceful operating system 198 shut down. If the user should make another actuation of the power switch 26 before the graceful shut down is completed, the power down procedure is escalated to an absolute (i.e., immediate) power down.

Figure 4A:
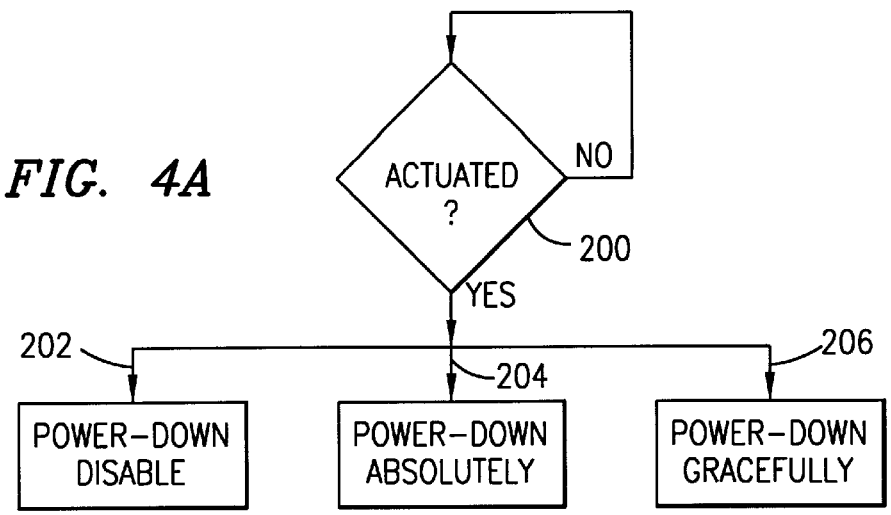
FIGS. 4A–4D are flow diagrams illustrating the power down process of the present invention.

Reference is now made to FIGS. 4A–4D wherein there are shown flow diagrams illustrating the power down process of the present invention. Turning first to FIG. 4A, the process determines in decision step 200 whether the power supply switch has been actuated. If not, the process cycles back to continue checking for actuation. If yes, it will be remembered that a timed internal power supply count down to termination of power begins responsive to the received signal indicative of an actuation of the power switch. Furthermore, an interrupt signal is generated and sent to the processor following each actuation of the power switch. The process then proceeds: (1) along path 202 is the user had previously selected the Power Down Disable option from the power down configuration menu; (2) along path 204 is the user had previously selected the Power Down Absolutely option from the power down configuration menu; and, (3) along path 206 is the user had previously selected the Power Down Gracefully option from the power down configuration menu.

Figure 4B:
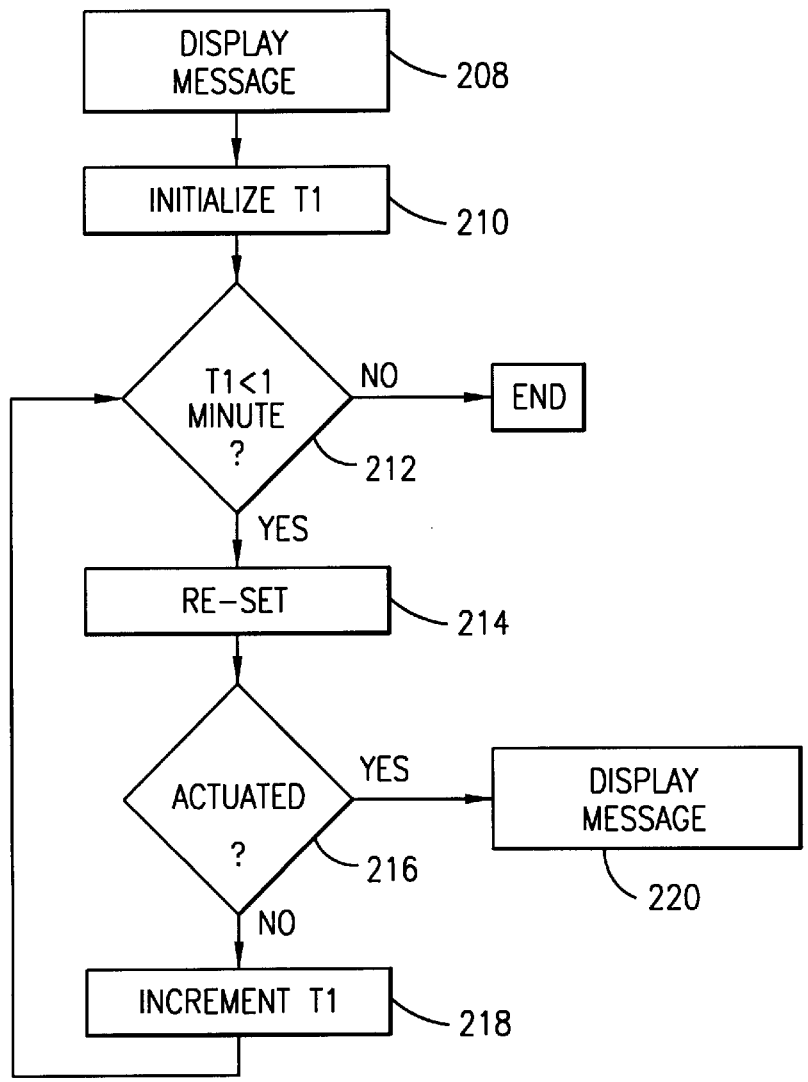

Turning now to FIG. 4B, if the Power Down Disable option had been selected, the process responds to the interrupt by causing a message to be displayed in step 208 informing the user that a powering down of the power supply is not permitted in the current configuration and requesting user acknowledgment of the same by making another actuation of the power switch. An incrementing timer T1 is then initialized in step 210. A determination is then made in decision step 212 as to whether the timer T1 has counted less than one minute. If yes, the process then causes the processor to send a message in step 214 over the I²C bus to re-set the power supply internal timer and prevent a power shut down. In decision step 216, a determination is made as to whether the power supply switch has been actuated again. If not, the timer TI is incremented in step 218, and the process returns to decision step 212. If the timer has counted to one minute (no at step 212), the process ends and then returns back to step 208 to begin again. Otherwise, the process continues waiting for the user to again actuate the power supply switch. If the switch is again actuated by the user (yes at step 216), the process causes a message to be displayed in step 220 acknowledging user actuation of the power supply switch. It is important for the power switch to be actuated again. If the external server power should fail before a second actuation, the server will default to an "off" state at subsequent external power-up. Furthermore, until the second actuation, the server must continue to re-set (step 214) the power supply internal timer to prevent a shut down.

Figure 4C:
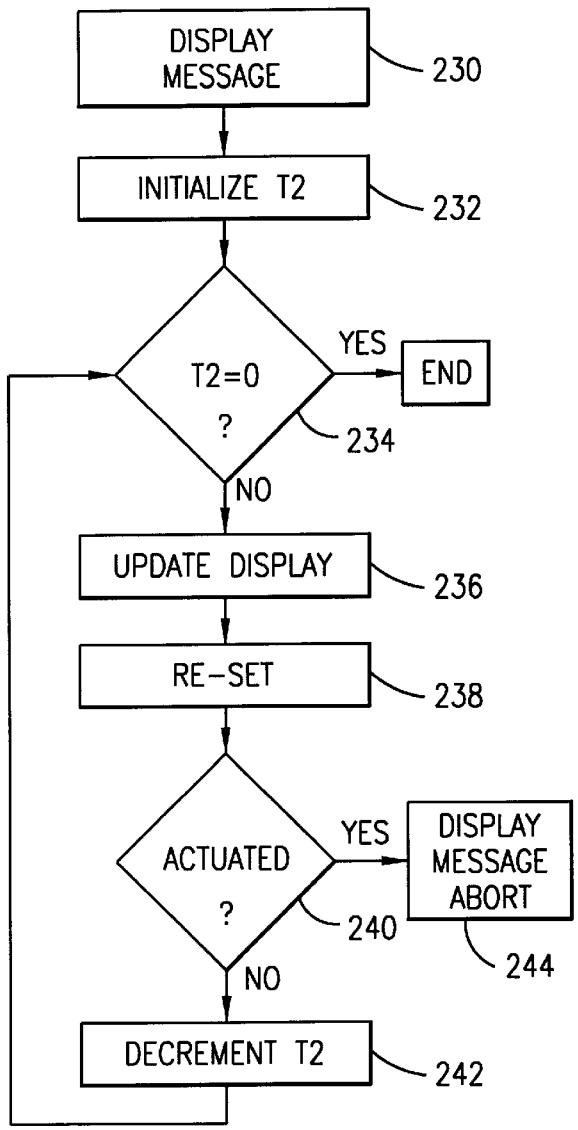

Turning now to FIG. 4C, if the Power Down Absolutely option had been selected, the process responds to the interrupt by causing a message to be displayed in step 230 informing the user that a powering down of the power supply is in progress. A decrementing timer T2 is then initialized in step 232 to a user selectable count down delay. A determination is then made in decision step 234 as to whether the timer T2 has counted down to zero. If no, the displayed message is updated in step 236 to reflect the current value of the count down timer T2. The process then causes the processor to send a message in step 238 over the I²C bus to re-set the internal power supply timer and temporarily delay a power shut down. In decision step 240, a determination is made as to whether the power supply switch has been actuated again. If not, the timer T2 is decremented in step 242, and the process returns to decision step 234. If the timer has counted down to zero (yes at step 234), the process ends, and the power supply will automatically shut down power when the re-set the internal power supply timer (from step 238) expires. Alternatively, at the end of the process (yes at step 234), a command may be sent to the power supply to perform an immediate shut down (perhaps by re-setting the internal timer to a zero or near-zero value). Otherwise, the process continues waiting for the timer T2 to expire or the user to again actuate the power supply switch. If the switch is again actuated by the user (yes at step 240), the process causes a message to be displayed in step 244 acknowledging user actuation of the power supply switch and aborting of the process to power down the power supply.

Figure 4D:
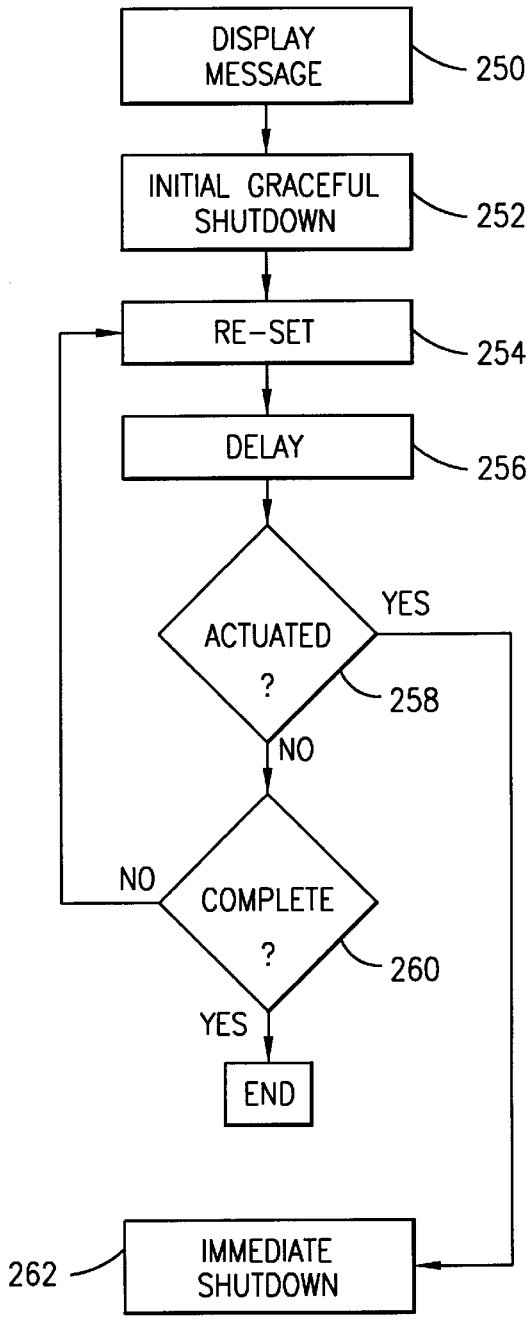

Turning now to FIG. 4D, if the Power Down Gracefully option had been selected, the process responds to the interrupt by causing a message to be displayed in step 250 informing the user that a graceful powering down of the power supply is in progress and informing the user that an immediate shut down may be triggered by making another actuation of the power switch. The process then initiates the operating system to perform a graceful shut down in step 252. The process then causes the processor to send a message in step 254 over the I²C bus to re-set the internal power supply timer and temporarily delay a power shut down. A one second delay in then applied in step 256. In decision step 258, a determination is made as to whether the power supply switch has been actuated again. If not, a determination is made in step 260 as to whether the operating system shut down has been completed. If not, the process returns to step 254. If the power supply switch has been actuated again (yes at step 258), the process commands the power supply in step 262 to immediately shut down. If the operating system shut down has been completed (yes at step 260), the process ends, and the power supply will automatically shut down power when the re-set the internal power supply timer (from step 254) expires. Alternatively, at the end of the process (yes at step 260), a command may be sent to the power supply to perform an immediate shut down (perhaps by re-setting the internal timer to a zero or near-zero value).

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A computing system, comprising:
   a power supply control switch;
   a power supply including a micro-controller having a programmable timer, the micro-controller operating to terminate application of power by the power supply to the computing system upon expiration of the programmable timer, and operating responsive to actuation of the power supply control switch to generate an ouput power supply interrupt signal, and further operating responsive to a received command signal for setting the programmable timer; and
   a processor operating responsive to receipt of the power supply interrupt signal to generate, in accordance with a user selected power down option, the command signal to control the setting of the programmable timer and the termination of power application by the power supply.

2. The computing system as in claim 1 further including a router for routing the power supply interrupt signal output from the micro-controller of the power supply to the processor, and for routing the command signal output from the processor to the micro-controller of the power supply.

3. The computing system as in claim 2 further including a bus connecting the router to the micro-controller of the power supply for carrying the command signal.

4. The computing system as in claim 3 wherein the bus comprises an I²C bus connecting the router to the micro-controller of the power supply.

5. The computing system as in claim 1 wherein the user selected power down option comprises a power down disable option, and the command signal output from the processor to the micro-controller of the power supply sets the programmable timer to prevent termination of power application by the power supply.

6. The computing system as in claim 1 wherein the user selected power down option comprises a power down absolutely option, and the command signal output from the processor to the micro-controller of the power supply sets the programmable timer to terminate power application by the power supply following completion of a count down period.

7. The computing system as in claim 1 wherein the user selected power down option comprises a power down gracefully option, and the command signal output from the processor to the micro-controller of the power supply sets the programmable timer to terminate power application by the power supply following a graceful shut down of an operating system for the processor.

8. The computing system as in claim 1 wherein the user selected power down option comprises a power down absolutely option, and the command signal output from the processor to the micro-controller of the power supply instructs the power supply to terminate power application by the power supply following completion of a count down period.

9. The computing system as in claim 1 wherein the user selected power down option comprises a power down gracefully option, and the command signal output from the processor to the micro-controller of the power supply instructs the power supply to terminate power application by the power supply following a graceful shut down of an operating system for the processor.

10. The computing system as in claim 1 further including a display panel responsive to signals output from the processor for displaying information concerning a status of the power application termination pursuant to the user selected power down option.

11. A method for responding to actuation of a power supply switch for a computing system, comprising the steps of:

signaling a power supply of the actuation of the power supply switch;

starting a power termination timer in response to the signaling;

interrupting a processor informing of the actuation of the power supply switch;

gracefully shutting down of an operating system of the processor in response to the interrupting;

continually resetting the power termination timer until the graceful shut down is completed; and terminating power application by the power supply when the power termination timer expires.

12. The method as in claim 11 further including the step of immediately terminating power application by the power supply in response to another actuation of the power supply switch.

13. The method as in claim 11 further including the steps of:

starting a count down timer in response to the actuation of the power supply switch; and performing the step of gracefully shutting down only following expiration of the count down timer.

14. The method as in claim 13 further including the step of:

displaying a value of the count down timer as well as information concerning a status of the power application termination.

15. The method as in claim 11 wherein the step of terminating comprises the step of instructing the power supply to terminate power application following completion of the graceful shut down.

16. A method for responding to actuation of a power supply switch for a computing system, comprising the steps of:

signaling a power supply of the actuation of the power supply switch;

starting a power termination timer in response to the signaling;

interrupting a processor informing of the actuation of the power supply switch;

starting a user count down timer to power termination by the processor in response to the interrupting;

continually resetting the power termination timer until the count down timer has expired; and terminating power application by the power supply when the power termination timer expires.

17. The method as in claim 16 further including the step of aborting the count down timer in response to another actuation of the power supply switch.

18. The method as in claim 16 further including the step of:

displaying a value of the count down timer as well as information concerning a status of the power application termination.

19. The method as in claim 16 wherein the step of terminating comprises the step of instructing the power supply to terminate power application following completion of the count down timer.

20. A method for responding to actuation of a power supply switch for a computing system, comprising the steps of:

signaling a power supply of the actuation of the power supply switch;

starting a power termination timer in response to the signaling;

interrupting a processor informing of the actuation of the power supply switch;

continually resetting the power termination timer until another actuation of the power supply switch occurs; and canceling power termination in response to the another actuation.

21. The method as in claim 20 wherein the step of canceling power termination comprises the step of displaying information concerning a status of the power application termination.

* * * * *